United States Patent [19]
Mehta et al.

[11] Patent Number: 4,969,164
[45] Date of Patent: Nov. 6, 1990

[54] PROGRAMMABLE THRESHOLD DETECTION LOGIC FOR A DIGITAL STORAGE BUFFER

[75] Inventors: Mayur M. Mehta, Austin, Tex.; Henry S. Choy, Fremont, Calif.

[73] Assignee: Advanced Micro Devices, Inc., Sunnyvale, Calif.

[21] Appl. No.: 343,622

[22] Filed: Apr. 27, 1989

[51] Int. Cl.$^5$ .............................................. G06F 7/00
[52] U.S. Cl. .................................... 377/41; 307/464; 377/49; 377/51
[58] Field of Search .................... 377/41, 51, 49, 29; 307/464

[56] References Cited

U.S. PATENT DOCUMENTS

| | | | |
|---|---|---|---|
| 3,924,078 | 12/1975 | Bussey | 377/29 |
| 4,139,840 | 2/1979 | Mogi | 377/41 |
| 4,667,337 | 5/1987 | Fletcher | 377/41 |
| 4,713,832 | 12/1987 | Hutson | 377/51 |
| 4,837,748 | 6/1989 | Chung et al. | 377/51 |

*Primary Examiner*—John S. Heyman
*Attorney, Agent, or Firm*—Foley & Lardner, Schwartz, Jeffery, Schwaab, Mack, Blumenthal & Evans

[57] ABSTRACT

A threshold detection logic circuit of simple and economical design is disclosed that indicates when the difference in the number of first operations to be counted and the number of second operations to be counted is either greater than or equal to a threshold value, or less than or equal to a threshold value. The threshold detection logic circuit employs the use of an overflow bit of a counter, which has a counting range of $2^{N+1}$ for a threshold range of $2^N$, in order to generate a threshold interrupt signal. In addition, the disclosed threshold detection logic circuit permits the threshold value to be programmed to any desired value.

13 Claims, 3 Drawing Sheets

| THRESHOLD VALUE | BINARY THRESHOLD VALUE | 2'S COMPLEMENT | COUNTER OUTPUT AFTER (W) WRITES |
|---|---|---|---|
| 0 (NOT USED) | | | |
| 1 | 001 | 111 | 1000 |
| 2 | 010 | 110 | 1000 |
| 3 | 011 | 101 | 1000 |
| 4 | 100 | 100 | 1000 |
| 5 | 101 | 011 | 1000 |
| 6 | 110 | 010 | 1000 |
| 7 | 111 | 001 | 1000 |

FIG. 2

| THRESHOLD VALUE | BINARY THRESHOLD VALUE | 1'S COMPLEMENT | COUNTER OUTPUT AFTER (W) WRITES | COUNTER OUTPUT AFTER W+1 WRITE |
|---|---|---|---|---|
| 1 | 001 | 110 | 0111 | 1000 |
| 2 | 010 | 101 | 0111 | 1000 |
| 3 | 011 | 100 | 0111 | 1000 |
| 4 | 100 | 011 | 0111 | 1000 |
| 5 | 101 | 010 | 0111 | 1000 |
| 6 | 110 | 001 | 0111 | 1000 |
| 7 | 111 | 000 | 0111 | 1000 |

FIG. 4

PROGRAMMABLE THRESHOLD DETECTION LOGIC FOR A DIGITAL STORAGE BUFFER

BACKGROUND OF THE INVENTION

The present invention relates generally to the field of digital storage buffers. In particular, the present invention provides an improved threshold detection logic circuit that determines when a buffer storage threshold has been reached to prevent data overflow.

First-in first-out (FIFO) buffers are commonly used in many digital systems to temporarily receive and store data while various tasks are being performed by the systems processing unit. A FIFO buffer is configured to permit data to be simultaneously written into the top of a memory stack having a plurality of storage locations while data is being read from the bottom of the memory stack. Data overflow can result if the processing unit does not read data from the FIFO prior to the last storage location of the stack being filled with data, which can occur if the processor is performing tasks not allowing data to be read from the FIFO while data is continually being received and stored in the FIFO.

In view of the above, it is necessary to insure that a read operation will be initiated by the processing unit prior to all of the storage locations of the memory stack being filled with data. For example, if a FIFO has a memory stack containing eight storage locations, write operations to the FIFO are being performed at the rate of once per clock cycle, and the processing unit requires three clock cycles to perform a read operation after receiving an interrupt signal, then the interrupt signal must be generated—at the very latest—after a threshold of five excess write operations has been reached (wherein the number of excess write operations performed is equal to the total number of write operations performed less the total number of read operations performed). Otherwise, all available storage locations will be filled prior to the processing unit being able to service the interrupt. The processing unit must also continue to perform read operations as long as the threshold value is exceeded.

The establishment of a programmable threshold level and the monitoring of the same can be accomplished by the use of a threshold pointer. For example, the FIFO may have a read pointer that indicates the storage location in the memory stack of the data word to be read in the next read operation, and a write pointer that indicates the storage location to which the next data word is to be written in the memory stack during the next write operation. A programmable threshold pointer can be provided and an interrupt can be generated when the number of data words written to the FIFO is greater than or equal to the threshold pointer.

Another approach to providing programmable threshold detection is to employ a counter which increments and decrements in response to write and read operations. A register is then provided in which a threshold value is stored. A comparator compares the count value to the threshold value stored in the register and generates an interrupt when the values are equal.

Both of the approaches to providing programmable threshold detection outlined above, however, have their own disadvantages and limitations. The implementation of a threshold pointer requires a shift register of the same length as the FIFO, and time is required to set the threshold pointer to the right position after the user programs the threshold value. The use of the counter and comparator only indicates when the number of excess write operations is equal to the threshold value and not when the threshold value is exceeded.

SUMMARY OF THE INVENTION

The present invention overcomes the disadvantages and limitations of the threshold detection devices described above, and provides a threshold detection logic circuit of simple and economical design that indicates when the difference in the number of first operations to be counted and the number of second operations to be counted is either greater than or equal to a threshold value, or less than or equal to a threshold value. In addition, the threshold detection logic circuit according to the present invention permits the threshold value to be programmed to any desired value.

BRIEF DESCRIPTION OF THE DRAWINGS

With the above as background, reference should now be made to the following detailed description of the preferred embodiments and the drawings for a more detailed explanation of the present invention, in which:

FIG. 2 is a table illustrating the operation of the threshold detection logic circuit illustrated in FIG. 1;

FIG. 4 is a table illustrating the operation of the threshold detection logic circuit illustrated in FIG. 3.

DETAILED DESCRIPTION OF THE PREFERRED EMBODIMENTS

Figure 1:
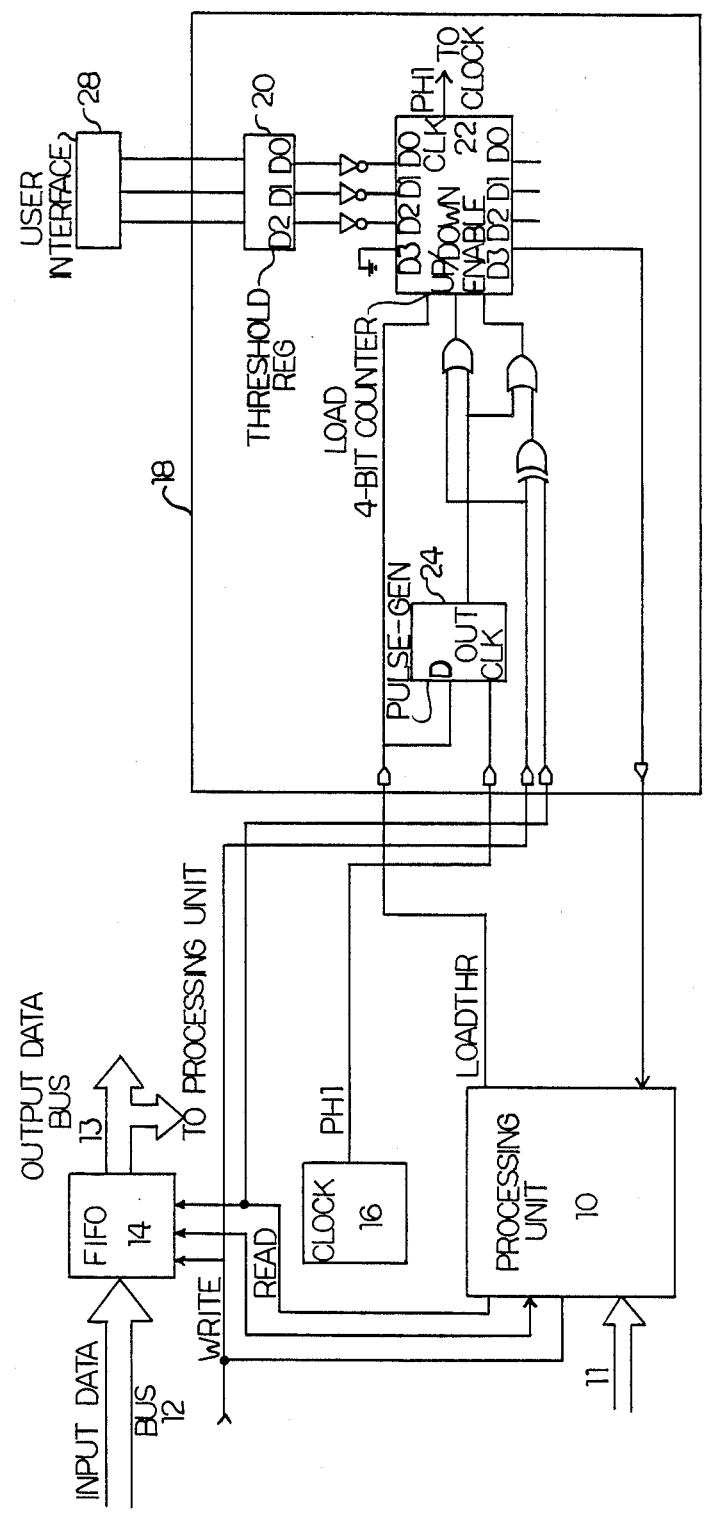
FIG. 1 illustrates a digital processing system incorporating a threshold detection logic circuit in accordance with a first embodiment of the invention.

Referring now to the block diagram of FIG. 1, a digital processing system is shown having a processing unit 10, an input data bus 12, a FIFO buffer 14 having a plurality of storage locations coupled to the processing unit 10, the input data bus 12, and an output data bus 13, a system clock 16, and a threshold detection circuit 18 coupled to the processing unit 10. The threshold detection circuit 18 includes a threshold register 20, an Up/-Down counter 22, and a pulse generator 24.

For purposes of illustrating the invention, the threshold register 20 has been shown as an element discrete from the processing unit 10, and is loaded directly with a desired threshold value via a user interface 28. It will be understood, however, that the threshold register 20 may constitute one of a number of general purpose registers provided as part of the processing unit 10 that may be loaded via an input bus 11 connected to the processing unit 10. The threshold register 20 can also reside within the FIFO buffer 14, in which case the counter 22 would have to be coupled to the output data bus 13 to received the threshold value from the threshold register 20. In any case, a load threshold value signal (LOADTHR) is supplied to the counter 22 after the threshold value has been loaded in the threshold register 20 in order to transfer the threshold value from the threshold register 20 to the counter 22. In the embodiment illustrated, the LOADTHR signal is generated by the processing unit 10. Alternatively, circuitry can be provided within the threshold detection circuit 18 to detect the loading of the threshold value into the threshold register 20 and generate the LOADTHR signal.

The output of the threshold register 20 is coupled to the input of counter 22 via inverters 26, which results in the one's complement of the value stored in the register 20 being loaded in the counter 22 when a load threshold value signal (LOADTHR) is received by the counter 22. The pulse generator 24 of the threshold detection logic 18 also generates a count-up pulse on the falling edge of the LOADTHR signal which increments the counter 22 by one (the counter increments when both the Up/Down and ENABLE inputs are at a logic high level, and decrements when the Up/Down input is at a logic low level and the ENABLE input is high), thereby resulting in the two's complement of the threshold value stored in the threshold register 20 being loaded in the counter 22. The digital processing system is then ready to process data received from the data bus 12.

During operation, the FIFO buffer 14 sequentially stores digital data words received from the input data bus 12 in the storage locations, until the processing unit 10 has time to fetch the stored data words from the FIFO buffer 14 by performing a read operation. For purposes of illustrating the invention, it will be assumed that the FIFO buffer 14 contains eight storage locations, the data words can be received and stored in the FIFO buffer 14 at the rate of one data word per clock cycle, and the processing unit requires three clock cycles to perform a read operation from the FIFO after being interrupted from performing a given task. In such a case, the threshold value should be set at a maximum of five, and more preferably at four, in order to insure data overflow does not occur.

The counter 22 has a counting range one order of magnitude greater than the range of the adjustable threshold value. In other words, the counter has a $2^{N+1}$ counting range if the desired adjustable threshold requires a range of $2^N$. In the embodiment illustrated in FIG. 1, the counter 22 is a four bit counter, and a range of eight (0-7) is provided for the threshold value by three input bits to the counter 22, with the most significant input bit (MSIB) of the counter 22 being connected to ground. The most significant output bit (MSOB) or overflow bit of the counter 22 is used to generate a threshold interrupt signal (THRESHOLD) which is supplied to the processing unit 10. The THRESHOLD signal indicates to the processing unit 10 that a read operation must be performed from the FIFO buffer 14 in order to prevent a loss of data from occurring.

As stated above, it is necessary to generate the THRESHOLD interrupt signal when the number of excess write operations, i.e., the total number of write operations less the total number of read operations, is equal to or greater than the programmed threshold value. Taking the two's complement of the desired threshold value permits the overflow bit of the counter to be used to generate the THRESHOLD signal when the number of excess write operations (W) reaches and exceeds the threshold value as shown in FIG. 2. The overflow bit of the counter will remain high as long as W is equal to or greater than the threshold value.

Specifically if the threshold value is set to five (0101), the two's complement of five (0011) will be loaded into the counter 22 (note two's complement was not performed on MSIB which was grounded). The counter 22 will then increment as follows for excess write operations:

| | |
|---|---|
| W = 1 | Counter Output 0100 |
| W = 2 | Counter Output 0101 |
| W = 3 | Counter Output 0110 |
| W = 4 | Counter Output 0111 |
| W = 5 | Counter Output 1000 |
| W = 6 | Counter Output 1001 |

Thus, the MSOB of the counter will switch to a high logic level when W is equal to the threshold value, and will remain high if W is greater than the threshold value, thereby generating the THRESHOLD interrupt signal.

Figure 3:
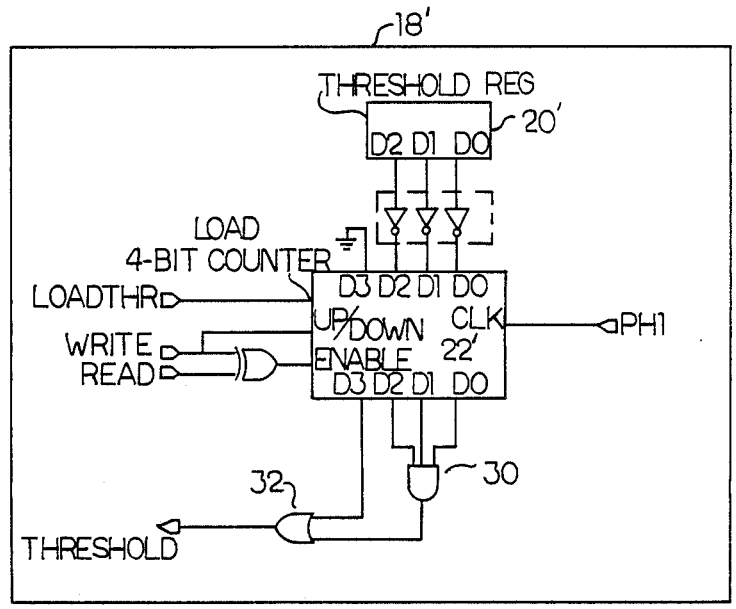
FIG. 3 is a threshold detection logic circuit according to a second embodiment of the invention that can be incorporated in the digital processing system illustrated in FIG. 1.

A second embodiment of the threshold detection circuit 18' employing only the one's complement is illustrated in FIG. 3. The second embodiment does not require the use of a pulse generator to load the two's complement in the counter 22'. Instead, the least significant output bits of the counter 22, are supplied to an AND gate 30, the output of which is supplied to an OR gate 32 along with the overflow bit to generate the THRESHOLD signal.

As illustrated in FIG. 4., the output of the counter 22, will go to 0111 when W equals the threshold value, resulting in the THRESHOLD line going high when the 0111 output of the counter 22, passes through the gates 30 and 32. If additional excess write operations occur, the overflow bit of the counter 22' will go to a logic "1" also causing the THRESHOLD line to go High. Thus, the threshold detection circuit 18, illustrated in FIG. 3 will also generate the THRESHOLD interrupt when N is equal to or greater than the threshold value.

Figure 5:
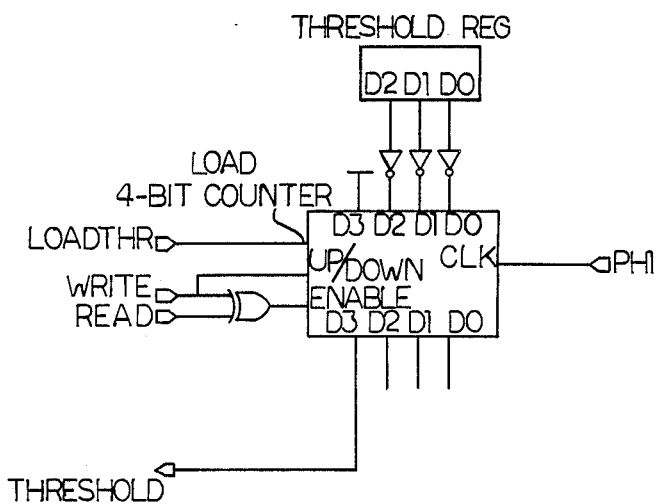
FIG. 5 is an example of a modification of the threshold detection logic circuit illustrated in FIG. 3.

It will be understood that the above description is of preferred exemplary embodiments of the present invention, and the invention is not limited to the specific forms shown. For example, it may be desirable in some cases to generate a THRESHOLD interrupt when W is less than or equal to the threshold value. The threshold detection circuit 18, can be modified as illustrated in FIG. 5 by typing the MSIB of the counter high and inverting the MSOB output of the counter to generate the THRESHOLD interrupt signal when W is less than or equal to the threshold value. Other variations and modifications can be effected within the spirit and scope of the appended claims.

What is claimed is:

1. A threshold detection logic circuit comprising:
    a. first means for loading a threshold value in a threshold value register;
    b. second means for loading an initial count value that is a complement of said threshold value in a counter, wherein said counter performs a first operation in response to a first input signal and a second operation in response to a second input signal;
    c. third means for generating an output signal when the difference between the total number of first operations performed by said counter and the total number of second operations performed by said counter is greater than or equal to said threshold value.

2. A threshold detection logic circuit as claimed in claim 1, wherein said first operation is an increment operation and said second operation is a decrement operation.

3. A threshold detection logic circuit comprising:
a. first means for loading a threshold value in a threshold value register;
b. second means for loading an initial count value that is related to said threshold value in a counter, wherein said count value loaded by said second means is the one's complement of said threshold value and wherein said counter performs a first operation in response to a first input signal and a second operation in response to a second input signal;
c. third means for generating an output signal when the difference between the total number of first operations performed by said counter and the total number of second operations performed by said counter is greater than or equal to said threshold value.

4. A threshold detection logic circuit as claimed in claim 1, wherein said threshold value has a range of $2^N$ and said counter has a count range of $2^{N+1}$.

5. A threshold detection logic circuit comprising:
a. first means for loading a threshold value in a threshold value register;
b. second means for loading an initial count value that is related to said threshold value in a counter, wherein said count value loaded by said second means is the two's complement of said threshold value and wherein said counter performs a first operation in response to a first input signal and a second operation in response to a second input signal, said first operation being an increment operation and said second operation being a decrement operation;
c. third means for generating an output signal when the difference between the total number of first operations performed by said counter and the total number of second operations performed by said counter is greater than or equal to said threshold value.

6. A threshold detection logic circuit comprising:
a. first means for loading a threshold value in a threshold value register;
b. second means for loading an initial count value that is a complement of said threshold value in a counter, wherein said counter performs a first operation in response to a first input signal and a second operation in response to a second input signal;
c. third means for generating an output signal when the difference between the total number of first operations performed by said second means and the total number of second operations performed by said second means is less than or equal to said threshold value.

7. A threshold detection logic circuit comprising:
a. first means for loading a threshold value in a threshold value register;
b. second means for loading an initial count value that is related to said threshold value in a counter, wherein said count value loaded by said second means is the one's complement of said threshold value where wherein said counter performs a first operation in responsive to a first input signal and a second operation in response to a second input signal;
c. third means for generating an output signal when the difference between the total number of first operations performed by said second means and the total number of second operations performed by said second means is less than or equal to said threshold value.

8. A threshold detection logic circuit as claimed in claim 7, wherein said threshold value has a range of $2^N$ and said counter has a counting range of $2^{N+1}$.

9. A threshold detection logic circuit as claimed in claim 6, wherein said first operation is an increment operation and said second operation is a decrement operation.

10. An apparatus, comprising:
a storage buffer for storing program instructions;
means for writing instructions into said storage buffer;
means for reading instructions from said storage buffer;
a counter;
means for initializing said counter with a count related to a complement of a threshold value, said threshold value being related to a storage capacity of said counter;
means for incrementing said counter for each write operations performed by said writing means;
means for decrementing said counter for each read operation performed by said reading means; and
means responsive to an overflow output of said counter for generating a threshold signal indicating that the threshold value has been reached.

11. An apparatus as claimed in claim 10 wherein said complement is a one's complement.

12. An apparatus as claimed in claim 10 wherein said complement is a two's complement.

13. An apparatus as claimed in claim 10 wherein said threshold value has a range of $2^N$ and said counter has a count range of $2^{N+1}$ and wherein said overflow output is a most significant output bit of said counter.

* * * * *